United States Patent
Hung et al.

(10) Patent No.: US 11,601,375 B2
(45) Date of Patent: Mar. 7, 2023

(54) ELECTRONIC DEVICE AND FRAME TRANSMISSION METHOD OF ELECTRONIC DEVICE

(71) Applicant: Realtek Semiconductor Corp., HsinChu (TW)

(72) Inventors: Han-Yi Hung, HsinChu (TW); Huai-Chih Ma, HsinChu (TW); Yi-Kuang Ko, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 163 days.

(21) Appl. No.: 17/331,608

(22) Filed: May 26, 2021

(65) Prior Publication Data

US 2022/0029927 A1    Jan. 27, 2022

(30) Foreign Application Priority Data

Jul. 27, 2020 (TW) .................................. 109125317

(51) Int. Cl.
| | |
|---|---|
| *H04L 47/36* | (2022.01) |
| *H04W 74/08* | (2009.01) |
| *H04W 28/02* | (2009.01) |
| *H04W 72/0446* | (2023.01) |

(52) U.S. Cl.
CPC ....... *H04L 47/365* (2013.01); *H04W 28/0284* (2013.01); *H04W 28/0289* (2013.01); *H04W 72/0446* (2013.01); *H04W 74/0816* (2013.01)

(58) Field of Classification Search
CPC ............ H04L 47/365; H04W 28/0284; H04W 28/0289; H04W 72/0446; H04W 74/0816
See application file for complete search history.

(56) References Cited

U.S. PATENT DOCUMENTS

| | | | | |
|---|---|---|---|---|
| 6,031,821 | A * | 2/2000 | Kalkunte | ................ H04L 47/10 370/235 |
| 9,231,870 | B2 | 1/2016 | Armstrong | |
| 2005/0002332 | A1 | 1/2005 | Oh | |
| 2012/0287829 | A1* | 11/2012 | Chang | ..................... H04L 12/12 370/296 |
| 2019/0246315 | A1* | 8/2019 | Kilian | ................... H04L 1/0007 |

FOREIGN PATENT DOCUMENTS

| | | |
|---|---|---|
| TW | 200507559 | 2/2005 |
| TW | 201338469 | 9/2013 |

* cited by examiner

*Primary Examiner* — Pao Sinkantarakorn
*Assistant Examiner* — Kabir U Jahangir
(74) *Attorney, Agent, or Firm* — Winston Hsu

(57) ABSTRACT

A frame transmission method of an electronic device, wherein the frame transmission method includes the steps of: receiving a pause frame from another electronic device, wherein the pause frame includes a plurality of packet size ranges and corresponding pause times; referring to content of the pause frame, and determining a first frame interval according to which packet size range a first packet to be sent to the other electronic device belongs to; and after a first frame including the first packet is sent to said another electronic device, at least waiting for the first frame interval before starting to send a second frame to said another electronic device.

13 Claims, 3 Drawing Sheets

| |
|---|
| Preamble(7B) |
| Start Frame Delimiter(1B) |
| Destination Address(6B) |
| Source Address(6B) |
| Type(2B) |
| Opcode(2B) |
| Frame Interval Control Indicator(2B) |
| Time Information #0 |
| Time Information #1 |
| Time Information #2 |
| ⋮ |
| Time Information #N |
| ⋮ |

FIG. 3

ELECTRONIC DEVICE AND FRAME TRANSMISSION METHOD OF ELECTRONIC DEVICE

BACKGROUND OF THE INVENTION

1. Field of the Invention

The present invention relates to a frame transmission method, and more particularly, to a frame transmission method of an electronic device.

2. Description of the Prior Art

In the IEEE 802.3x specification, a pause frame is mentioned, such that a receiving end transmits the pause frame to a transmitting end when network is congested, in order to notify the transmitting end to pause sending packets out for mitigating the congestion. In addition, the transmitting end does not resume sending packets to the receiving end until a pause time indicated by the pause frame expires or the receiving end sends another packet to notify that the receiving end can continue to receive the packets. However, in the above-mentioned operation, when the network is in congestion, the transmitting end repeatedly switches between a full-speed transmission state and a paused transmission state when transmitting packets, resulting in extremely uneven packet flow. In addition, the receiving end needs to always detect a current state of the packet buffer to transmit the pause frame in time, which also causes a processing burden on the circuit of the receiving end.

SUMMARY OF THE INVENTION

One of the objectives of the present invention is to provide a frame transmission method of a network device, which may refer to a packet size to determine a pause time following transmission of a packet, such that the overall network transmission flow is more even, so as to prevent a situation that a transmitter transmits too many packets in an instant and causes network congestion or packet accumulation at a receiver.

At least one embodiment of the present invention provides a frame transmission method of an electronic device. The frame transmission method including: connecting to another electronic device; receiving a pause frame from said another electronic device, wherein the pause frame includes a plurality of packet size ranges and a plurality of corresponding pause times; referring to a content of the pause frame, and determining a first frame interval according to which packet size range a first packet to be sent to said another electronic device belongs to; and after a first frame including the first packet is sent to said another electronic device, at least waiting for the first frame interval before starting to send a second frame to said another electronic device.

At least one embodiment of the present invention provides an electronic device for connecting to another electronic device. The electronic device includes a receiving circuit, a frame interval controller and a transmitting circuit. The receiving circuit is configured to receive a pause frame from said another electronic device, wherein the pause frame includes a plurality of packet size ranges and a plurality of corresponding pause times. The frame interval controller is configured to refer to a content of the pause frame, and to determine a first frame interval according to which packet size range a first packet to be sent to said another electronic device belongs to. The transmitting circuit is configured to send a first frame including the first packet to said another electronic device, and after a first frame is sent, at least wait for the first frame interval before starting to send a second frame to said another electronic device.

At least one embodiment of the present invention provides an electronic device for connecting to another electronic device. The electronic device includes a transmitting circuit and a receiving circuit. The transmitting circuit is configured to send a pause frame to said another electronic device, wherein the pause frame includes a plurality of packet size ranges and a plurality of corresponding pause times for use by said another electronic device. The receiving circuit is configured to receive multiple frames from said another electronic device, wherein intervals between the multiple frames are determined according to the plurality of packet size ranges and the plurality of corresponding pause times of the pause frame.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a diagram illustrating a pause frame according to an embodiment of the present invention.

DETAILED DESCRIPTION

Figure 1:
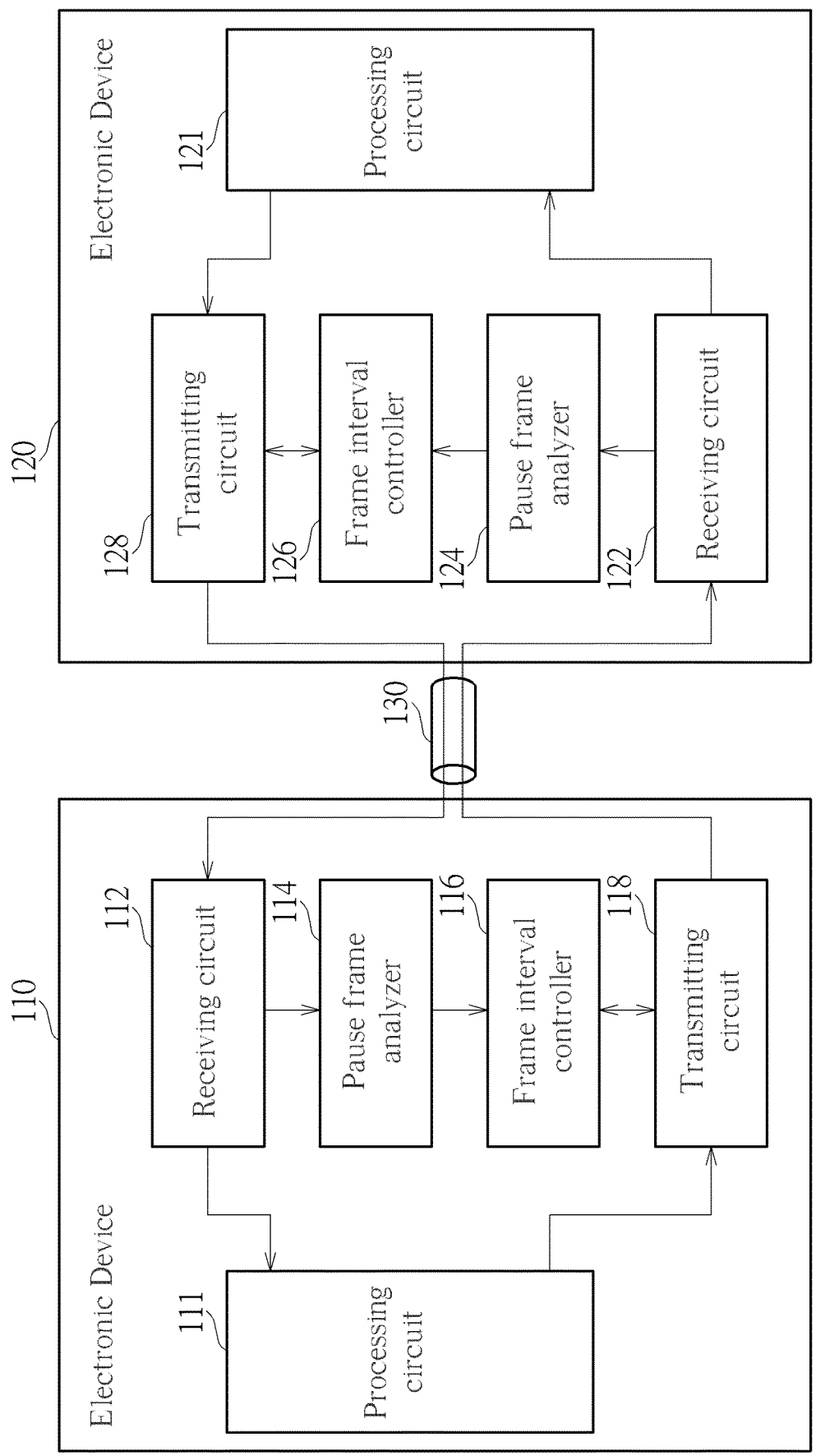
FIG. 1 is a diagram illustrating a network system according to an embodiment of the present invention.

FIG. 1 is a diagram illustrating a network system according to an embodiment of the present invention. As shown in FIG. 1, the network system includes electronic devices 110 and 120, wherein the electronic devices 110 and 120 are connected to each other by a network cable 130 for data transmission and reception. In the present embodiment, the electronic devices 110 and 120 support Full-Duplex Ethernet and support IEEE 802.3x specification. The electronic device 110 includes a processing circuit 111, a receiving circuit 112, a pause frame analyzer 114, a frame interval controller 116 and a transmitting circuit 118; and the electronic device 120 includes a processing circuit 121, a receiving circuit 122, a pause frame analyzer 124, a frame interval controller 126 and a transmitting circuit 128. Each of electronic devices 110 and 120 in the present embodiment can be any electronic device that can use a network cable for data transmission and reception, such as a switch, a router, or any electronic device that can be connected to a network cable.

Figure 2:
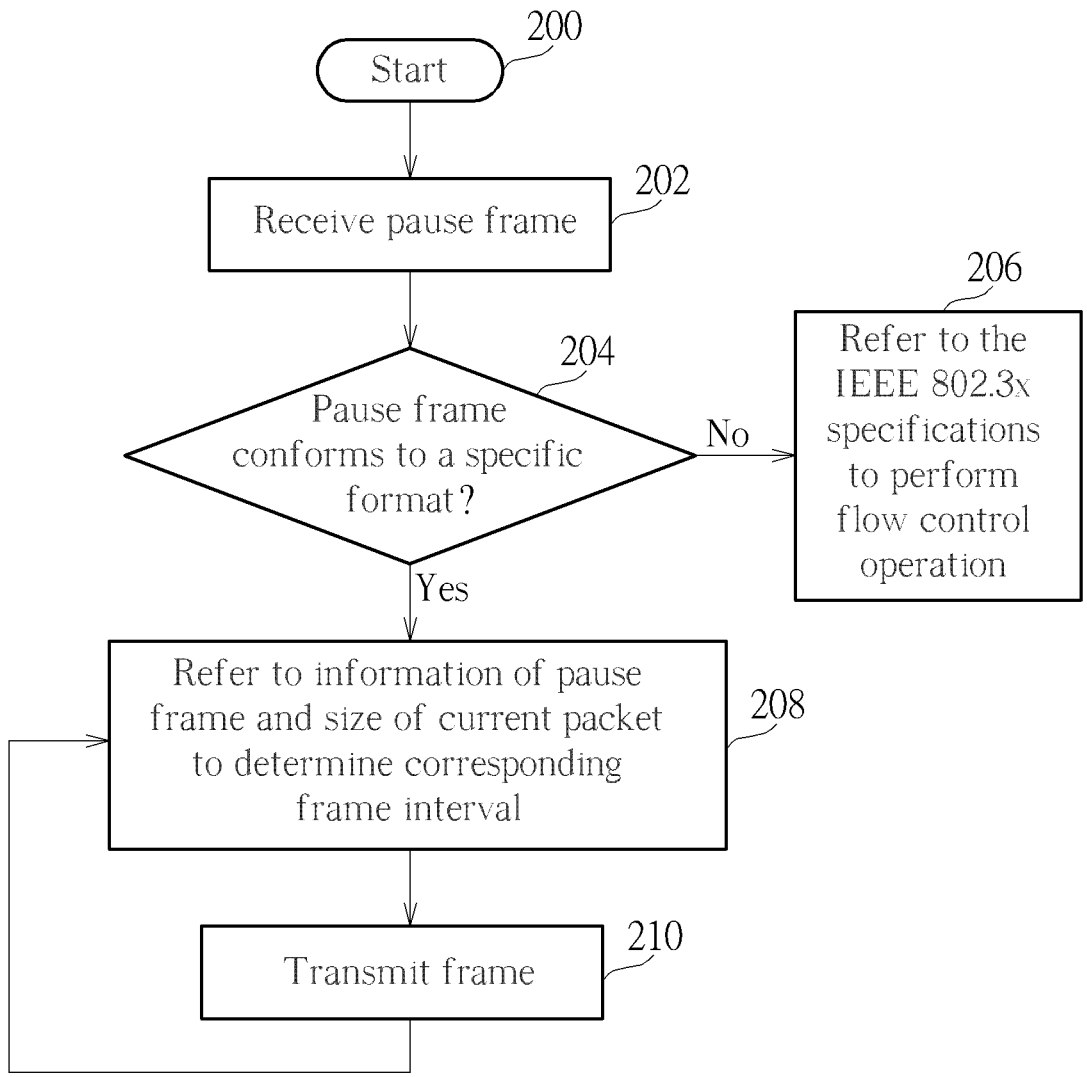
FIG. 2 is a flowchart illustrating a frame transmission method of an electronic device according to an embodiment of the present invention.

Regarding the operation of the electronic device 110, please refer to FIG. 1 in conjunction with the flowchart shown in FIG. 2. In step 200, the flow starts, and the electronic device 110 establishes a link with the electronic device 120 and starts signal transmission and reception. In step 202, the receiving circuit 112 receives a frame/packet from the electronic device 120 through the network cable 130, and analyzes the received frame/packet and transmits it to the processing circuit 111 for subsequent processing. In the present embodiment, the receiving circuit 112 receives a pause frame from the electronic device 120 and sends the pause frame to the pause frame analyzer 114 for analysis. In step 204, the pause frame analyzer 114 analyzes the received pause frame and determines whether the pause frame conforms to a specific format. If No, the flow proceeds with step 206. If Yes, the flow proceeds with step 208. Specifically, referring to FIG. 3 that illustrating a diagram of a pause frame 300 conforming to the specific format according to an embodiment of the present, the pause frame 300 includes multiple fields, and the multiple fields are a preamble (7 bytes), a start frame delimiter (SFD) (1 byte), a destination address (6 bytes), a source address (6 bytes), a type (2 bytes), an opcode (2 bytes), a frame interval control indicator (2 bytes), time information #0, #1-#N, etc. in sequence. It should be noticed that the preamble, the SFD, the destination address, the source address, the type and the opcode in the pause frame 300 shown in FIG. 3 are fields defined by the IEEE 802.3x specification. Hence, the content and function of these fields are well described in the IEEE 802.3x specification. In the present embodiment, since only a part of the codewords of the 2-byte opcode in the IEEE 802.3x specification have definitions, a codeword of the pause frame 300 can be set to an undefined codeword in the current IEEE 802.3x specification, such as 0xff, to represent that the pause frame 300 has the specific format. In the present embodiment, if the content of the opcode has definition in the current IEEE 802.3x specification, for example, the opcode is 0x0001, the pause frame analyzer 114 determines that the received pause frame does not conform to the specific format; and if the content of an opcode conforms to a codeword corresponding to the specific format, such as 0xff, the pause frame analyzer 114 determines that the received pause frame conforms to the specific format.

In step 204, the main contains used for determining whether the pause frame 300 conforms to the specific format are the opcode, the frame interval control indicator, and the time information #0-#N. The operation and definition of the remaining fields can refer to the IEEE 802.3x specifications. The following description focuses on the opcode, the frame interval control indicator and the time information #0-#N.

In step 206, since the pause frame received by the receiving circuit 112 conforms to the IEEE 802.3x specification, the operation of the electronic device 110 can skip the frame interval controller 116, and the transmitting circuit 118 pauses the transmission of subsequent frames until the pause time indicated by the pause frame expires or the receiving circuit 112 receives a message which indicates that the transmission can be resumed.

In step 208, the frame interval controller 116 temporarily stores the frame interval control indicator and the time information #0-#N shown in FIG. 3 in an internal register or memory, for later being used to determine the frame intervals of subsequent frames during transmission. Specifically, the frame interval control indicator and the time information #0-#N as a whole can be regarded as including multiple packet size ranges and corresponding pause times. When the processing circuit 111 is required to send data to the electronic device 120, the transmitting circuit 118 transmits information related to the size of the current packet to be transmitted to the frame interval controller 116, and the frame interval controller 116 determines the corresponding pause time according to the size of the current packet to be transmitted to the electronic device 120, and refers to the corresponding pause time to determine the frame interval. The transmitting circuit 118 pauses the frame transmission for a period of time (e.g., the frame interval) after transmitting the current packet to the electronic device 120, and starts to transmit the next frame after the end of the period of time (e.g., the frame interval). In the present embodiment, the packet size can be the size of the packet included in the network layer or the data link layer in the frame.

In one embodiment, the frame interval control indicator of the pause frame 300 may be used to represent multiple packet size ranges. For example, the frame interval control indicator includes 2 bytes (16 bits), of which the zeroth to third bits can be used to represent 16 or fewer valid index values, and the fourth to fifteenth bits can be used to represent a parameter INC, wherein the packet size range represented by the frame interval control indicator can be shown in Table 1.

TABLE 1

| Index Value | Packet Size Range |
|---|---|
| 0 | PKT_S < 64 B |
| 1 | 64 ≤ PKT_S < 64 + INC |
| 2 | 64 + INC ≤ PKT_S < 64 + 2 * INC |
| 3 | 64 + 2 * INC ≤ PKT_S < 64 + 3 * INC |
| ... | ... |
| 15 | 64 + 14 * INC ≤ PKT_S |

In Table 1, "PKT_S" is used to indicate the size of the packet, "B" is used to indicate bytes, and the parameter INC can be any suitable value, such as 64 bytes.

In one embodiment, each of the time information #0-#N includes 2 bytes (16 bits), where the zeroth to third bits can be used to indicate the pause time related to the packet size, such that the zeroth to third bits can be used to indicate the pause time calculated by using the packet size, and the fourth to fifteenth bits can be used to indicate a fixed pause time. The time information #0-#N can be shown in Table 2.

TABLE 2

| Index Value | Pause Time calculated by Packet Size | Fixed Pause Time |
|---|---|---|
| Time Information #0 | 0 | 0 |
| Time Information #1 | PKT_S * T | T |
| Time Information #2 | (PKT_S/2) * T | 2 * T |
| Time Information #3 | (PKT_S/4) * T | 3 * T |
| ... | ... | ... |
| Time Information #7 | (PKT_S/2^(7-1)) * T | 7 * T |
| ... | ... | ... |

In Table 2, time information #0 corresponds to the index value "0" of Table 1, time information #1 corresponds to the index value "1" of Table 1, time information #2 corresponds to the index value "2" of Table 1, etc. "T" is used to indicate a length of the pause time, where "T" can be 8 bit times, where one bit time is the time required for the electronic device 100 to transmit one 1-bit data. For example, for 100 Mbps (Million bits per second) Ethernet, 1 bit time is 10 nanoseconds; and for 1000 Mbps Ethernet, 1 bit time is 1 nanosecond. In addition, the pause time calculated by using the packet size can be set by directly taking the integer part of calculation result, and the pause time of each of the time information #0-#N is the sum of the pause time calculated by using the packet size and the fixed pause time in Table 2.

In an example, assuming that the transmitting circuit 118 is preparing to transmit a 130-byte packet to the electronic device 120. When the parameter INC is set to 64 bytes, the packet size corresponds to the index value "2" in Table 1. Therefore, the calculation of the pause time corresponds to time information #2 in Table 2, wherein the pause time calculated by using the packet size is 65*T, and the fixed pause time is 2*T. Therefore, the pause time calculated through Table 2 is 67*T.

After determining the pause time of the frame to be transmitted by the transmitting circuit 118, the frame interval controller 116 can determine the frame interval according to the pause time. Specifically, since a minimum predetermined interval between two consecutive frames is defined in IEEE 802.3x specification as at least 96 bit times, the final frame interval determined by the frame interval controller 116 may be equal to 96 bit times plus the above-mentioned pause time calculated according to Table 2. For example, assuming that the transmitting circuit 118 is preparing to transmit a 130-byte packet to the electronic device 120, the pause time calculated according to Table 2 is 67*8 bit times, such that the frame interval controller 116 finally determines that the frame interval is (96+67*8) bit times.

It should be noticed that the content of the above calculated pause time and the frame interval is just an example for illustrative purposes and is not a limitation of the present invention. As long as the frame interval controller 116 can determine different frame intervals according to the size of the packet to be transmitted, the contents of Table 1 and Table 2 above can be modified accordingly, or can be integrated into a single look-up table to directly determine the corresponding frame interval according to the packet size. These alternative designs all belong to the scope of the present invention.

In step 210, the transmitting circuit 118 transmits the frame to the electronic device 120, and the flow proceeds with step 208. In addition, after the frame transmission is completed, the transmitting circuit 118 pauses for a period of time before transmitting the next frame, such that the next frame and the currently transmitted frame have the frame interval determined above. In detail, assuming that the transmitting circuit 118 is required to transmit the first frame, the second frame and the third frame in sequence, the frame interval controller 116 can determine the first frame interval corresponding to the first frame and the second frame interval corresponding to the second frame according to the above-mentioned mechanism. Hence, after finishing the transmission of the first frame, the transmitting circuit 118 pauses the transmission for the first frame interval and starts to transmit the second frame after an end of the first frame interval; and after finishing the transmission of the second frame, the transmitting circuit 118 pauses the transmission for the second frame interval and starts to transmit the third frame after an end of the second frame interval.

It should be noticed that if the pause frame transmitted by the electronic device 120 in the beginning has the pause frame 300 shown in FIG. 3, the frame interval controller 116 temporarily stores the packet size range and the corresponding pause time (or the information of the frame interval) recorded in the pause frame 300. Whenever the transmission circuit 118 is required to transmit subsequent packets, the frame interval controller 116 determines the frame interval between each transmitted packet and the next frame, to accurately control the network transmission flow from the electronic device 110 to the electronic device 120. In this way, the electronic device 110 is prevented from suffering the problem of serious uneven transmission speed in the prior art. In addition, since the packet size range and the corresponding pause time (or the information of the frame interval) recorded in the pause frame 300 are temporarily stored in a memory or a register in the frame interval controller 116 for subsequent long-term use, the electronic device 120 is not required to send a pause frame to the electronic device 110 frequently, but only sends a new pause frame 300 when necessary (for example, a network congestion occurs suddenly) to update the packet size range and the corresponding pause time (or the frame interval) for ensuring a larger frame interval following transmission of each packet.

In addition, since the data rates of network interfaces of the electronic devices 110 and 120 must not be higher than the committed information rate (CIR) of network suppliers, if the electronic devices 110 and 120 use the highest data rate to transmit, it will cause the electronic devices 110 and 120 continuously switch between a full-speed transmission state and a paused transmission state. Therefore, the electronic device 120 can determine the packet size range and the corresponding pause time (or the information of the frame interval) according to the above-mentioned CIR, and transmits the pause frame 300 that carries this information to the electronic device 110, such that the network transmission flow between the electronic devices 110 and 120 is more even.

In the description of the above embodiment, the electronic device 110 receives the pause frame from the electronic device 120, and transmits the frame to the electronic device 120 after the frame interval is determined according to the packet size. The electronic devices 110 and 120 support Full-Duplex Ethernet. Similarly, the electronic device 120 can also receive the pause frame from the electronic device 110, and transmits the frame to the electronic device 110 after the frame interval is determined according to the packet size. Since they have the same or similar operations, that is, the operations of the processing circuit 121, the receiving circuit 122, the pause frame analyzer 124, the frame interval controller 126 and the transmitting circuit 128 of the electronic device 120 are similar/identical to that of the processing circuit 111, the receiving circuit 112, the pause frame analyzer 114, the frame interval controller 116 and the transmitting circuit 118 of the electronic device 110, further description is omitted here for simplicity.

Summarizing the present invention briefly, in the electronic device and related frame transmission method of the present invention, after a pause frame is received from another electronic device, the frame interval controller inside the electronic device can determine the frame interval following the transmission of the frame according to the packet size range and the corresponding pause time recorded in the pause frame. Through the present invention, the network transmission flow between the electronic devices can be appropriately controlled to prevent the electronic devices from suffering the problem that the frame transmission switches between a full-speed transmission state and a paused transmission state when the network is congested in the prior art, and said another electronic device is not required to continuously transmit the pause frame, thereby relieving the processing burden.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A frame transmission method of an electronic device, comprising:

connecting to another electronic device;

receiving a pause frame from said another electronic device, wherein the pause frame includes a plurality of packet size ranges and a plurality of corresponding pause times;

referring to a content of the pause frame, and determining a first frame interval according to which packet size range a first packet to be sent to said another electronic device belongs to; and after a first frame including the first packet is sent to said another electronic device, at least waiting for the first frame interval before starting to send a second frame to said another electronic device.

2. The frame transmission method of claim 1, further comprising:

referring the content of the pause frame, and determining a second frame interval according to which packet size range a second packet to be sent to said another electronic device belongs to; and after a second frame including the second packet is sent to said another electronic device, at least waiting for the second frame interval before starting to send a third frame to said another electronic device.

3. The frame transmission method of claim 1, wherein the plurality of corresponding pause times are not completely the same.

4. The frame transmission method of claim 3, wherein referring to the content of the pause frame, and determining the first frame interval according to which packet size range the first packet to be sent to said another electronic device belongs to comprises:

determining a first pause time according to which packet size range the first packet to be sent to said another electronic device belongs to; and calculating the first frame interval according to the first pause time and a minimum preset interval.

5. The frame transmission method of claim 4, wherein determining the first pause time according to which packet size range the first packet to be sent to said another electronic device belongs to comprise:

determining a pause time generated by using the packet size and a fixed pause time according to which packet size range the first packet to be sent to said another electronic device belongs to; and calculating the first frame interval according to the pause time generated by using the packet size and the fixed pause time.

6. The frame transmission method of claim 1, further comprising:

temporarily storing the multiple packet size ranges of the pause frame and the corresponding multiple pause times of the pause frame into the electronic device, for later being used to determine the frame intervals corresponding to multiple frames subsequently sent to said another electronic device.

7. An electronic device for connecting to another electronic device, the electronic device comprising:

a receiving circuit, configured to receive a pause frame from said another electronic device, wherein the pause frame includes a plurality of packet size ranges and a plurality of corresponding pause times;

a frame interval controller, configured to refer to a content of the pause frame, and to determine a first frame interval according to which packet size range a first packet to be sent to said another electronic device belongs to; and a transmitting circuit, configured to send a first frame including the first packet to said another electronic device, and after a first frame is sent, at least wait for the first frame interval before starting to send a second frame to said another electronic device.

8. The electronic device of claim 7, wherein the frame interval controller refers the content of the pause frame, and determines a second frame interval according to which packet size range a second packet to be sent to said another electronic device belongs to; and after a second frame including the second packet is sent to said another electronic device, the transmitting circuit at least waits for the second frame interval before starting to send a third frame to said another electronic device.

9. The electronic device of claim 7, wherein the plurality of corresponding pause times are not completely the same.

10. The electronic device of claim 9, wherein the frame interval controller determines a first pause time according to which packet size range the first packet to be sent to said another electronic device belongs to, and calculates the first frame interval according to the first pause time and a minimum preset interval.

11. The electronic device of claim 10, wherein the frame interval controller determines a pause time generated by using the packet size and a fixed pause time according to which packet size range the first packet to be sent to said another electronic device belongs to; and calculates the first frame interval according to the pause time generated by using the packet size and the fixed pause time.

12. The electronic device of claim 7, wherein the multiple packet size ranges of the pause frame and the corresponding multiple pause times of the pause frame are temporarily stored into the electronic device, for later being used by the frame interval controller to determine frame intervals corresponding to multiple frames subsequently sent to said another electronic device.

13. An electronic device for connecting to another electronic device, the electronic device comprising:

a transmitting circuit, configured to send a pause frame to said another electronic device, wherein the pause frame includes a plurality of packet size ranges and a plurality of corresponding pause times for use by said another electronic device; and a receiving circuit, configured to receive multiple frames from said another electronic device, wherein intervals between the multiple frames are determined according to the plurality of packet size ranges and the plurality of corresponding pause times of the pause frame.

\* \* \* \* \*